United States Patent [19]

Roze

[11] Patent Number: 4,789,061

[45] Date of Patent: Dec. 6, 1988

[54] MAGNETIC TAPE CASSETTE CONTAINER

[76] Inventor: Paul F. Roze, 8 Rue de la Lande Seche, Cesson - Sevigne, France, 35-510

[21] Appl. No.: 119,935

[22] Filed: Nov. 13, 1987

[51] Int. Cl.⁴ ............................................. B65D 85/67
[52] U.S. Cl. ....................................... 206/387; 206/472
[58] Field of Search ................................. 206/387, 472

[56] References Cited

U.S. PATENT DOCUMENTS

| | | | |
|---|---|---|---|
| D. 226,146 | 1/1973 | Price | 206/387 |
| 3,640,379 | 2/1972 | Weingarden | 206/387 |
| 3,743,081 | 7/1973 | Roberg et al. | 206/387 |
| 4,002,355 | 1/1977 | Sendor | 206/472 X |
| 4,724,957 | 2/1988 | Burgschweiger | 206/387 X |

FOREIGN PATENT DOCUMENTS

| | | | |
|---|---|---|---|
| 928259 | 6/1973 | Canada | 206/472 |
| 086542 | 8/1983 | European Pat. Off. | 206/387 |
| 2451347 | 5/1976 | Fed. Rep. of Germany | 206/387 |
| 2221784 | 10/1974 | France | 206/387 |
| 2305923 | 10/1976 | France | 206/387 |
| 8001570 | 10/1981 | Netherlands | 206/387 |
| 659147 | 12/1986 | Switzerland | 206/387 |
| 1601673 | 11/1981 | United Kingdom | 206/387 |

Primary Examiner—William Price
Attorney, Agent, or Firm—Pollock, Vande Sande & Priddy

[57] ABSTRACT

A storage container for magnetic tapes that are housed in conventional magnetic tape cassette container. The cassette containers are attached to a support which is held in a frame enclosed by a book-like cover.

11 Claims, 5 Drawing Sheets

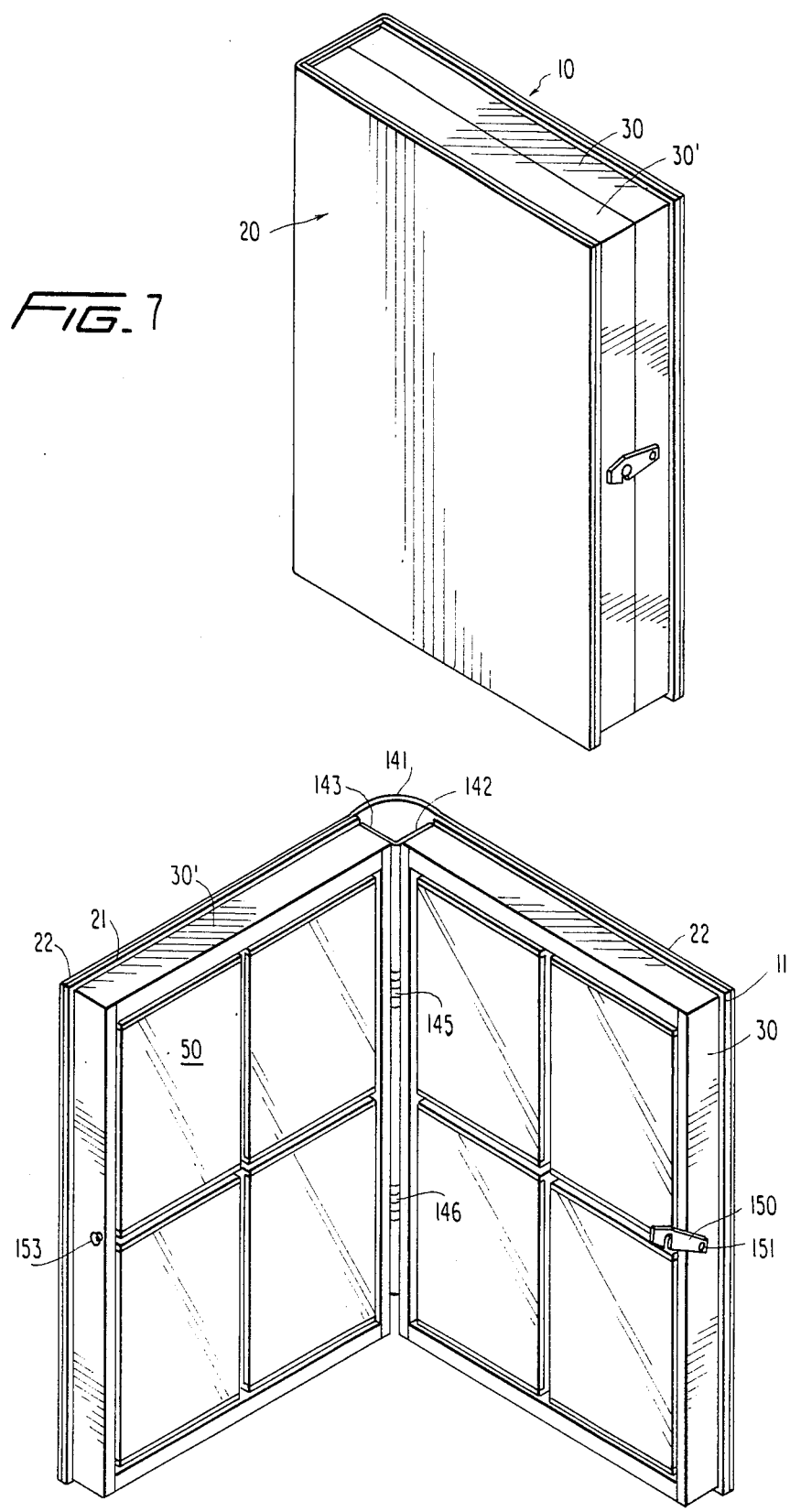

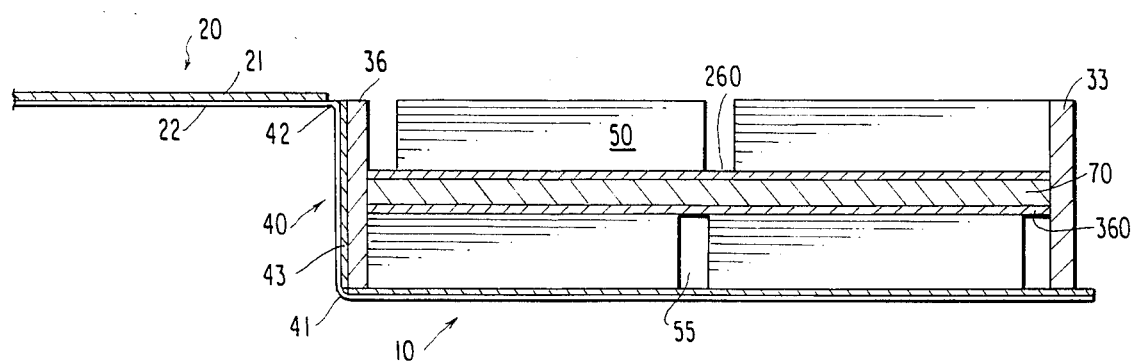
FIG_9

MAGNETIC TAPE CASSETTE CONTAINER

TECHNICAL FIELD

The present invention relates to a handy storage arrangement or container for magnetic tape cassettes.

BACKGROUND ART

Since its introduction, the magnetic tape cassette has found widespread usage as a convenient device for storing, playing and recording magnetic signals. Wide usage of the magnetic tape cassette taken together with the fact that its capacity is time limited, means that many users have a large number of magnetic tape cassettes. These users then have a need for convenient storage. There are a large variety of devices which have the sole function of storing magnetic tape cassettes. Many of these devices provide for the storage of the magnetic tape cassette per se, see for example French patent No. 2,221,784 or Canadian patent No. 1,169,389. Other devices L such as described in U.K. published application No. 2,003,118 provide a compartment for magnetic tape cassette containers, so that the cassettes themselves remain within the containers in which they are sold, and the containers are removably held in the book like container. Finally, other devices such as the one described in French patent No. 2,239,186 provide a booklike container within which are secured a plurality of magnetic tape cassette containers which themselves can be used to store the magnetic tape cassettes per se.

The present invention is directed to improving the storage arrangement for magnetic tape cassette containers from the point of view of convenience of the user and simplicity in manufacturing cost.

In accordance with the invention a prime component of the storage container is a rectangular frame. The frame has interior and exterior dimensions of length and width and a depth dimension. Both the interior and exterior length of the frame exceed twice the length of a conventional magnetic tape cassette container, and the internal and external width dimension of the frame exceeds the width of a conventional magnetic tape cassette container. The frame has a depth which is in excess of the depth of a conventional magnetic tape cassette container. As a result, a plurality of magnetic tape cassette containers can be arranged, in a gridlike fashion, within the internal dimensions of the rectangular frame. The frame can be manufactured from a variety of components, and the component selection depends mainly on ease of manufacture. For example, the rectangular frame can be manufactured from wood, molded plastic or even metal.

Another element in accordance with the invention is a magnetic tape cassette container support. The support has length and width dimensions which are slightly smaller than the internal dimensions of the frame. The support in one embodiment is generally planar in form and has secured to it at least four magnetic tape cassette containers, in a gridlike arrangement. The width of both the support and the interior dimension of the frame are selected so as to exceed twice the width of a conventional magnetic tape cassette container, so that the containers, as secured on the support, can be spaced to allow for manual access. The dimensions of the support are arranged so that the support can be manually inserted into the frame. In some embodiments of the invention, the support, in use, can be manually inserted or removed from the frame. In other embodiments of the invention, the support is secured to the frame, after its insertion so that in use it cannot be removed from the frame. The container in accordance with the invention also includes a book-like assembly surrounding the frame. The book-like assembly includes at least a pair of rigid, generally planar members, each with a length and width greater than the exterior length and width of the rectangular frame. The book-like assembly further includes a hinge joining the rigid, generally planar members into a book-like assembly and providing for rotational movement of the rigid planar members relative to each other about a longitudinal axis of the hinge.

Finally, the invention also provides for securing the rectangular frame to the book-like assembly.

One specific embodiment of the invention includes at least two of the rectangular frames, and two rigid magnetic tape cassette container supports, one for insertion into each frame. The hinge can comprise a flexible book-like hinge and each rectangular frame is secured to a different one of the rigid, generally planar members.

A different embodiment of the invention which also includes two rigid magnetic tape cassette container supports and a pair of rectangular frames, further includes one or more rigid hinges. In this embodiment of the invention the rigid hinges have characteristics similar to a conventional door hinge in that the hinge includes a plate secured to each of the frames, each of the hinges including a segmented pin receiving cylinder. The segmented pin receiving cylinders on the two different plates interleave so that when a pin is inserted within the interleaved, segmented pin receiving cylinders, a hinge is formed allowing for relative rotation of one frame with respect to another about an axis defined by the pin.

In still another embodiment of the invention, a cover element is provided having a length approximately equal to the exterior length of the rectangular frame and a width approximately equal to the depth of the rectangular frame. The hinge comprises two flexible book-like hinges each connected between the cover element and one of the rigid generally planar members. In this embodiment of the invention, the rectangular frame is secured to the cover element. In accordance with a further particular feature of this embodiment of the invention, the rectangular frame has a depth which exceeds twice the depth of the conventional magnetic tape cassette container so that a pair of supports can be inserted into the frame, one from each side with the magnetic tape cassette containers on each support facing away from the other support. In accordance with this particular specific embodiment, the rectangular frame may also include a planar-like divider spaced approximately middepth of the frame so that when the support is placed into the frame it contacts the divider with the result that the free surface of the magnetic tape cassette containers lie at about the same level as the top edge of the frame.

In a variation on the embodiment just described, the invention uses a divider in lieu of the magnetic cassette container support. In this arrangement, the magnetic cassette container supports are secured, in the grid-like fashion already described, to both faces of the divider. The magnetic cassette container supports may be permanently secured to the different faces of the divider during the course of manufacture. As an alternative, the divider may be provided with an attachment means which allows a plurality of magnetic cassette containers to be secured to the divider via the attachment means. In this alternative, the container of the invention may be sold without magnetic cassette containers secured to the attachment means, so that a purchaser can secure his own magnetic cassette containers to the attachment means. It should also be apparent that manufacture of the inventive container could include attachment of the magnetic cassette containers to the attachment means.

BRIEF DESCRIPTION OF THE DRAWINGS

The present invention will now be further described in the following portions of this specification so as to enable those skilled in the art to make and use the same when taken in conjunction with the attached drawings in which like reference characters identify identical apparatus and in which:

FIG. 2 is an isometric view of the container in a partially open configuration and FIG. 3 is a section of the container of FIG. 1 in a fully open condition to illustrate the different components;

FIGS. 5 and 6 represent the storage container in accordance with a different embodiment of the invention wherein FIG. 6 is an isometric view of the container in a closed condition and FIG. 5 is a section of the container partly open;

FIGS. 7 and 8 relate to a third embodiment of the invention wherein FIG. 7 is an isometric view of the container in a closed condition and FIG. 8 is an isometric view of the container in a partly open condition; and FIG. 9 is a variation of FIG. 3 for an embodiment wherein the invention does not include the magnetic tape cassette container support.

DETAILED DESCRIPTION OF PREFERRED EMBODIMENTS

Figure 1:
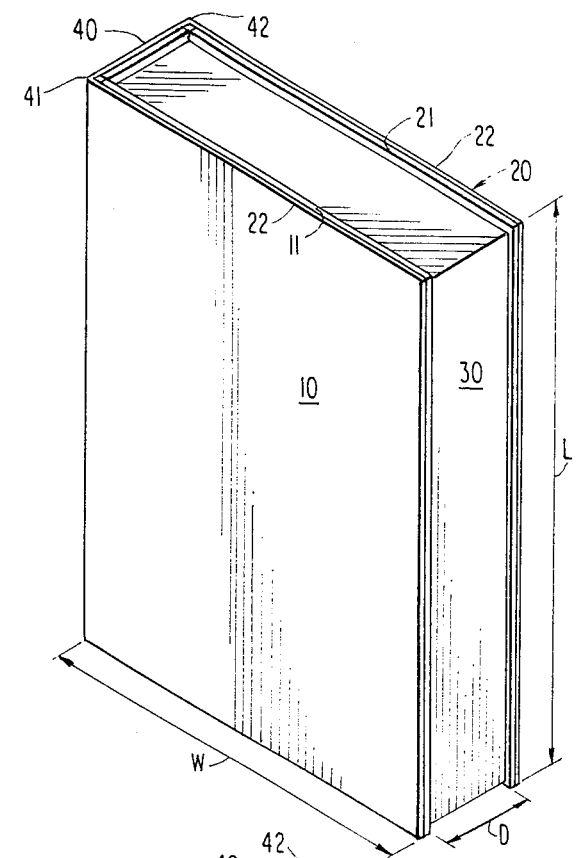
FIGS. 1-3 represent a first embodiment of the invention and FIG. 1 is an isometric view of the container in a closed condition.

FIG. 1 is an isometric view of a first embodiment of the storage container of the present invention. As shown in FIG. 1 the container includes a pair of rigid, generally planar members 10 and 20. Each of the members 10 and 20 is of a like size and has a length L which, as will be described below, is greater than twice the length of a conventional magnetic tape cassette container and a width W which is greater than twice the width of a conventional magnetic tape cassette container. The members 10 and 20 are, in turn, comprised of rigid elements 11 and 21, respectively and a cover 40. Located between the planar members 10 and 20 is a rectangular frame 30. The depth D of this rectangular frame 30 is greater than the depth of a conventional magnetic tape cassette container, and in this embodiment of the invention, greater than twice that depth. An additional element as shown in FIG. 1 is a cover element 40 which is essentially the same length as each of the planar elements 10 and 20 and has a width which is approximately equal to or greater than the depth of the frame element 30. The cover element 40 is secured to the planar members 10 and 20 by book-like hinges 41 and 42. More particularly, the planar members 10 and 20 may comprise a rigid element (11 or 21) either enclosed within or covered by a flexible fabric-like material which may comprise leather, plastic (such as vinyl) or a similar fabric. The planar members 10 and 20 and the cover element 40 are covered by a single sheet of this material so that at the joint 41 and 42, the material itself forms a book-like hinge As a result, the element 10 for example can be rotated relative to the cover element 40 about an axis defined by the hinge 41 and likewise the element 20 can be rotated relative to the cover element 40 about an axis defined by the hinge element 42.

Figure 2:
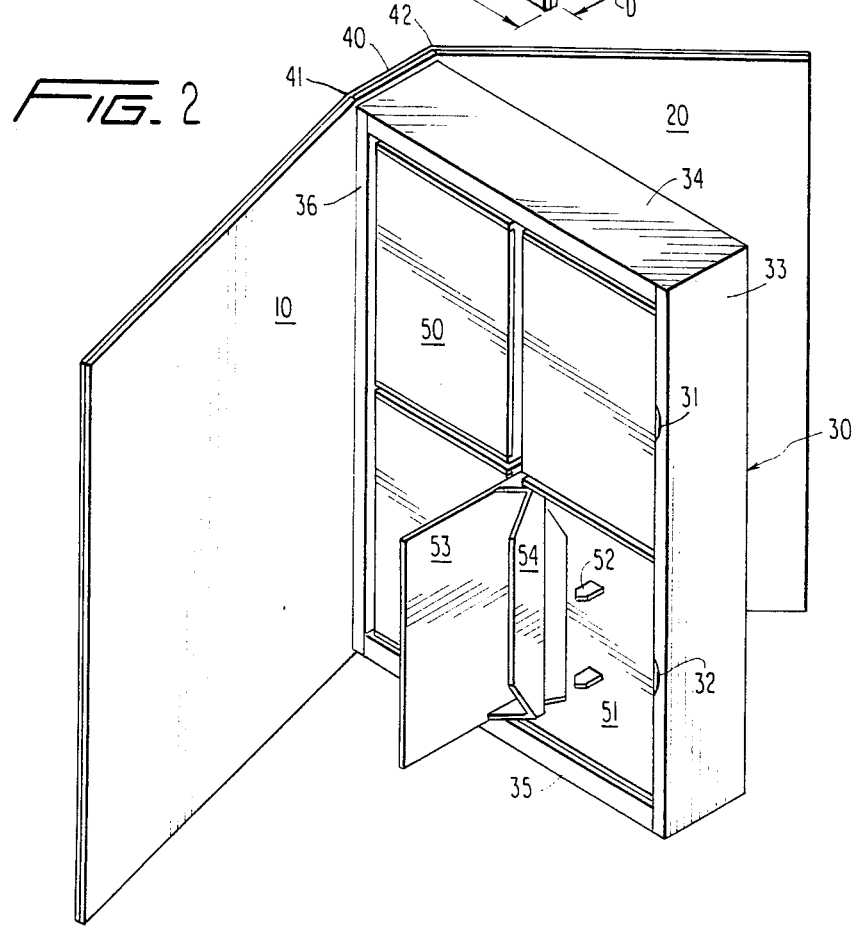

FIG. 2 is a view of the embodiment of FIG. 1 with the planar members 10 and 20 rotated, relative to the cover element 40, from the position shown in FIG. 1. In the open condition, as illustrated in FIG. 2, the components of the frame 30 are more visible. More particularly, the frame 30 includes longitudinally extending elements 33 and 36 having an exterior length L, and a depth D. In addition the frame 30 includes horizontally extending elements 34 and 35. The longitudinal dimension of the elements 34 and 35 is equal, and equal to the width W of the frame 30. The interior dimensions, both length and width of the frame 30 are of course less than the exterior dimensions by the thickness of the elements 33-36. The interior dimensions are arranged to be greater than twice the respective lengths and widths of the conventional magnetic tape cassette containers for reasons which will be explained. FIG. 2 also shows four conventional magnetic tape cassette containers 50 located in a grid-like arrangement within the frame 30. As is wellknown, the conventional magnetic tape cassette container includes a bottom wall 51 secured to which are a pair of posts 52, and a rotatable cover element 53 having a lip 54. With the cover rotated to the open position, a magnetic tape cassette per se can be inserted into or withdrawn from the space between the cover 53 and the lip 54. With the magnetic tape cassette properly located between the lip 54 and the cover 53, as the cover 53 is rotated toward the bottom 51, the posts 52 will be received within hubs of the magnetic tape cassette. Since opening the magnetic tape cassette container requires the user to rotate the cover 53, there is necessarily a space between one column of the containers 50 and a second column of the containers 50. For the purpose of allowing the user to open the cover 53 of the front column of containers within the frame element 30, cutouts 31 and 32 are provided in the element 33.

Figure 3:
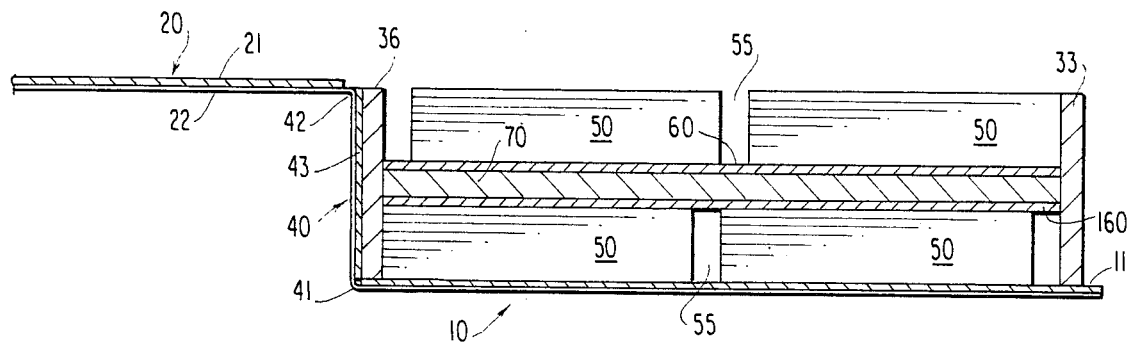

FIG. 3 is a section of the storage container of FIGS. 1 and 2, with the container in its fully open position.

As shown in the section of FIG. 3 the rigid, generally planar members 10 and 20 are revealed to include a rigid element 21 and 11 and a flexible covering 22. Likewise, the cover element 40 includes a rigid element 43 which is covered by a continuation of the cover element 22 so that at the joints between the elements 21 and 43 and 43 and 11 the cover element 22 forms hinges 41 and 42 to allow rotation of the planar elements 10 and 20 relative to the cover element 40.

The section shows the magnetic tape cassette container support 60 (which is not seen in FIGS. 1 and 2) and two of the four cassettes which are mounted on the support 60. As seen in FIG. 3 the frame also includes a divider 70 which is generally planar and located mid-depth of the frame 30 so that with the support 60 adjacent the divider 70, the top surface of the containers 50 are at about the same level as the top surface of the frame 30. The space 55 between the containers 50 is also shown in FIG. 3.

FIG. 3 also shows that, in addition to the four containers 50 illustrated in FIG. 2, the container includes an additional four magnetic tape cassette containers 50 located between the dividers 70 and the generally planar member 10. Thus it should be apparent to those skilled in the art that the depth D of the frame 30 exceeds twice the depth of the conventional tape cassette container 50, by at least the thickness of two of the supports 60 and that of the divider 70. The cassette containers 50 are secured to the support 60 through any conventional means such as an adhesive. The containers may be so secured at the time of manufacture or after sale, by a user. The supports 60 may be (although not necessarily) permanently secured to divider 70 also by adhesives or the like.

Figure 4:
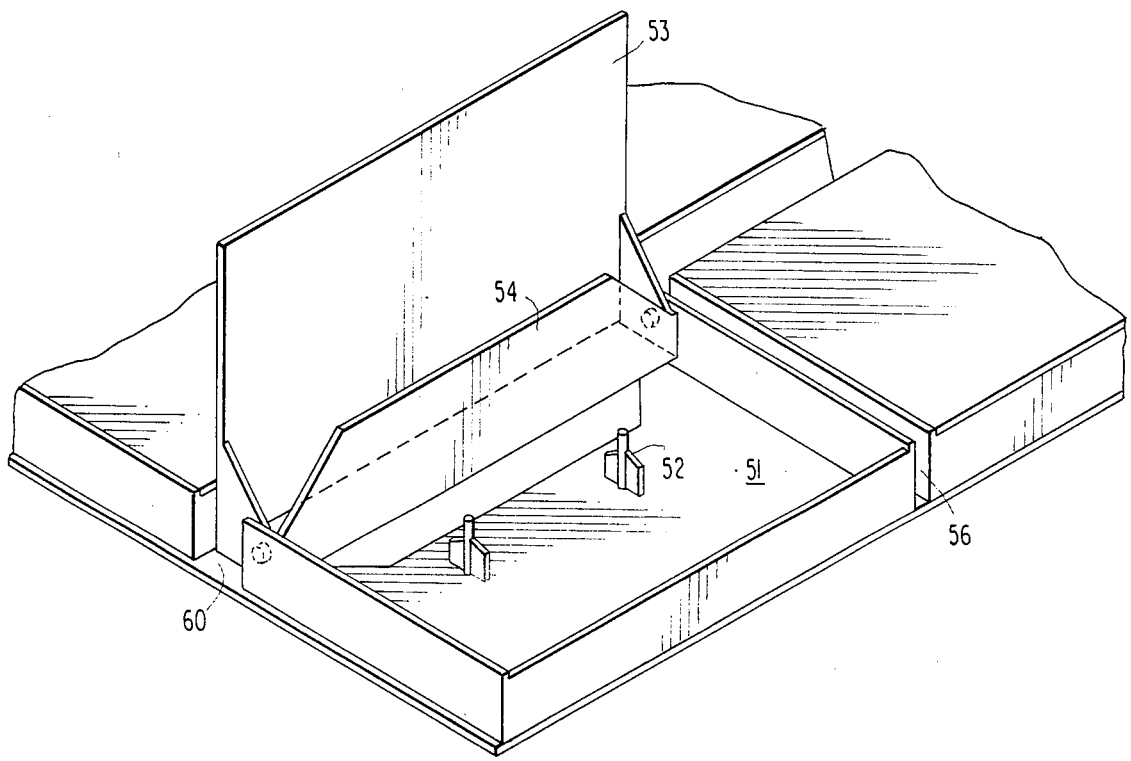
FIG. 4 is a detail of the magnetic tape cassette container support in accordance with all the embodiments of the invention.

FIG. 4 is a detail of a typical magnetic tape cassette container support 60 showing four cassettes secured thereto. FIG. 4 also illustrates that in addition to the spacing 55 between adjacent columns of containers 50, there may be an additional space 56 between adjacent rows of the containers 50.

Figure 5:
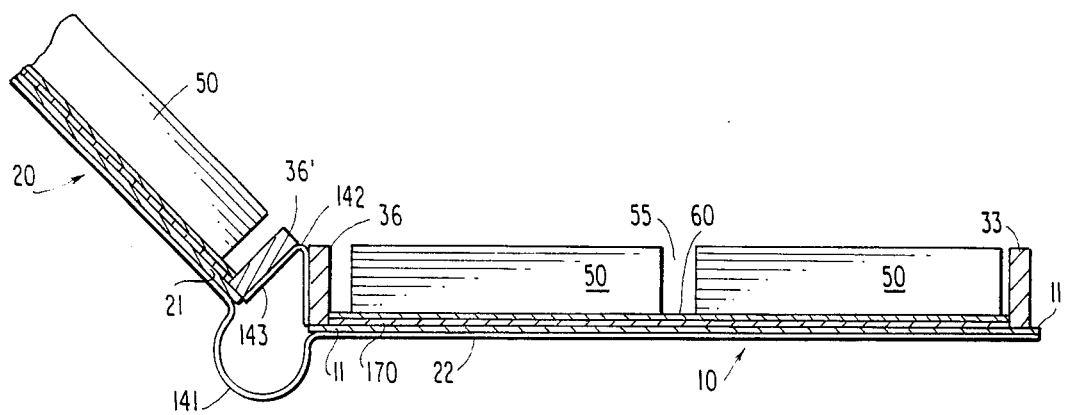
Figure 6:
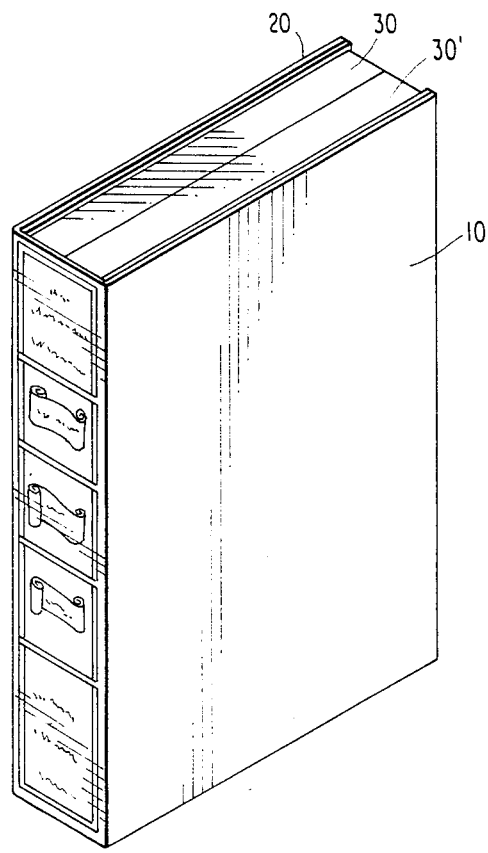

FIGS. 5 and 6 illustrate a different embodiment of the invention. FIG. 6 is an isometric view of this embodiment in a closed condition illustrating that this embodiment also includes the pair of rigid, generally planar members 10 and 20. Instead of having a single rectangular frame element 30, this embodiment includes a pair of rectangular frames 30 and 30'. The section of FIG. 5, showing the container of this embodiment in a partly open condition illustrates, in more detail, several of the components and the manner in which the magnetic tape cassette containers 50 are secured.

More particularly, FIG. 5 shows that the rigid, generally planar member 10 includes the support 11 and the outer, flexible covering 22 which is continuous and covers the rigid, generally planar member 20 as well, thus forming a book-like hinge 141. The frame 30 is secured to the rigid, generally planar element 11 through any conventional means. The frame elements 33 and 36 are illustrated in this section as well as a rigid backing 170 joining the elements 33 and 36. It is the rigid backing 170 which is secured to the support element 11. Located within the frame 30, as seen in FIG. 5 is the magnetic tape cassette container support 60 to which is secured the magnetic tape cassette containers 50. FIG. 5 also shows the space 55 between adjacent columns of containers 50 to allow the user access to the cover element 53 of the rear column of containers 50. The frame element 33 includes the same notches 31 and 32 shown in FIG. 2.

The second frame 30' of this embodiment is secured, in a generally similar fashion to the rigid, generally planar member 20, as shown in FIG. 5.

Inasmuch as the hinge arrangement 141 of this embodiment is relatively fragile, a supplemental hinge 142 is provided in the form of a flexible strip which is secured between the frames 30 and 30'. The flexible strip 143 provides for a hinge-like element at the location 142.

FIGS. 7 and 8 relate to still a third embodiment of the invention. This embodiment of the invention is similar to the embodiment shown in FIGS. 5 and 6 in that it includes a pair of frames 30 and 30', each secured to a different one of the generally planar members 10 and 20. This embodiment differs from the embodiment shown in FIGS. 5 and 6 in that, in addition to the hinge 142 formed by the flexible element 143 secured to the frames 30 and 30', additional hinging action is provided by the door-type hinges 145 and 146. As is conventional, each of these hinges includes a pair of plates (not seen), one of the plates secured to frame element 30 and the other secured to the frame element 30'. The plate elements include a segmented pin receiving cylinder, the segmented elements interleave and receive a pin so that the plate elements can be pivoted about the pin. Since the frames 30 and 30' are secured to the plate elements, they too can pivot about the pin.

This embodiment also includes a latch 150 pivotally secured to the frame 30 by a connector 151 such as a screw, nail or the like. When the container is closed, e.g. when the frame elements 30 and 30' are rotated so as to overlap, the latch 150 can be rotated to cooperate with the pin 153 on the frame element 30'. It should be apparent that the latch arrangement of this embodiment can also be used with the embodiment illustrated in FIGS. 5 and 6. Further, the mechanical locking latch may be replaced by a magnetically operating latch.

FIG. 9 is a section similar to FIG. 3 illustrating a further alternate embodiment to that shown in FIGS. 1–3. The embodiment shown in FIG. 9 differs from the embodiment of FIGS. 1–3 in that the magnetic tape cassette container support 60 has been omitted. In its place, there is an attachment means 260, on one face of the divider 70 and a similar attachment means 360 on the other face of the divider 70. The attachment means serves to attach a magnetic tape cassette container 50. In one form the attachment means 260 can comprise a sheet of conventional double stick adhesive tape or the like. It should be apparent that the attachment means need not cover the full width of the frame. Alternatively the attachment means 260 can comprise a sheet or strips of single sided adhesive tape which is otherwise secured to the faces of the divider 70. In connection with this embodiment of the invention, the inventive container can be sold with the magnetic tape cassette containers 50 already secured to the divider 70. That, however, is not essential and the purchaser may install magnetic tape cassette containers 50 or even both the magnetic tape cassette containers 50 as well as the attachment means 260.

It should be apparent from the foregoing that applicant has taught a storage container for magnetic tapes which provides for storing those tapes in the conventional magnetic tape cassette containers which are secured to elements of the inventive container. The simple components of the invention are readily manufactured and assembled and provide the user with a convenient storage arrangement for a plurality, such as eight magnetic tape cassette containers. It should also be apparent that by merely extending the dimensions of some of the elements, the capacity of the inventive container can be increased. It should also be apparent that further changes can be made, all within the spirit and scope of the invention which is to be construed in accordance with the attached claims.

I claim:

1. A storage container for magnetic tape cassettes comprising:
   at least one rectangular frame, said rectangular frame having interior and exterior dimensions with an interior length greater than twice a length of a conventional magnetic tape cassette container, an interior width greater than twice a width of a conventional magnetic tape cassette container and a depth greater than a depth of a conventional magnetic tape cassette container,
   a pair of rigid, generally planar members, each of a length and width greater than exterior length and width of said rectangular frame, hinge means joining said rigid, generally planar members into a book like assembly providing for rotational movement of said rigid, generally planar members relative to each other about a longitudinal axis of said hinge means, at least one rigid magnetic tape cassette container support, said support having a length and a width slightly less than inside dimensions of said rectangular frame so that said support can be manually inserted into said frame including at least four magnetic tape cassette containers secured thereto, and securing means for securing said rectangular frame to said book like assembly.

2. A storage container for magnetic tape cassettes as recited in claim 1, which includes at least two of said rectangular frames and two rigid magnetic tape cassette container supports, and wherein:

said hinge means comprises a flexible book hinge, and said securing means secures each said rectangular frame to a different one of said rigid, generally planar members.

3. A storage container for magnetic tape cassettes as recited in claim 1, which includes at least two of said rectangular frames and two rigid magnetic tape cassette container supports, and wherein:

said hinge means comprises a flexible book hinge, said securing means secures each said rectangular frame to a different one of said rigid, generally planar members, and which further includes a plurality of rigid hinges securing said rectangular frames together for relative rotational movement about an axis defined by said rigid hinges.

4. A storage container for magnetic tape cassettes as recited in claim 1 which further includes:

a cover element with a length approximately equal to said exterior length of said rectangular frame and a width approximately equal to said depth of said rectangular frame, and wherein:

said hinge means comprises two flexible book hinges, each connected between said cover element and one of said rigid, generally planar members, and said securing means secures said rectangular frame to said cover element.

5. A storage container as recited in claim 4 which includes a pair of said rigid magnetic tape cassette container supports, and said rectangular frame has:

a depth greater than twice a depth of a conventional magnetic tape cassette container, and a generally planar divider for supporting said rigid magnetic tape cassette container supports.

6. A storage container as recited in claim 1 wherein said magnetic tape cassette container support is removable from said rectangular frame.

7. A storage container as recited in claim 1 wherein said magnetic tape cassette container support is permanently secured with said rectangular frame.

8. A storage container for magnetic tape cassettes comprising:

at least one rectangular frame, said rectangular frame having interior and exterior dimensions with an interior length greater than twice a length of a conventional magnetic tape cassette container, an interior width greater than twice a width of a conventional magnetic tape cassette container and a depth greater than a depth of a conventional magnetic tape cassette container, a pair of rigid, generally planar members, each of a length and width greater than exterior length and width of said rectangular frame, hinge means joining said rigid, generally planar members into a book like assembly providing for rotational movement of said rigid, generally planar members relative to each other about a longitudinal axis of said hinge means, container at least one rigid magnetic tape cassette support secured within said rectangular frame, said support including at least four magnetic tape cassette containers secured thereto, and securing means for securing said rectangular frame to said book-like assembly.

9. A storage container for magnetic tape cassettes as recited in claim 8 which further includes:

a cover element with a length approximately equal to said exterior length of said rectangular frame and a width approximately equal to said depth of said rectangular frame, and wherein:

said hinge means comprises two flexible book hinges, each connected between said cover element and one of said rigid, generally planar members, and said securing means secures said rectangular frame to said cover element.

10. A storage container as recited in claim 9 wherein said rectangular frame has a depth greater than twice the depth of a conventional magnetic tape cassette container.

11. A storage container as recited in claim 8 wherein said rigid magnetic tape cassette container support includes adhesive attachment means for securing said magnetic-tape cassette containers to said magnetic tape cassette container support.

* * * * *